United States Patent [19]

Funaki

[11] Patent Number: 4,853,922
[45] Date of Patent: Aug. 1, 1989

[54] METHOD OF CLEANING THE SURFACE OF AN OPTICAL DISC AND A CLEANING DEVICE

[75] Inventor: Yoshinori Funaki, Himeji, Japan

[73] Assignee: Daicel Chemical Industries, Ltd., Osaka, Japan

[21] Appl. No.: 184,564

[22] Filed: Apr. 21, 1988

Related U.S. Application Data

[63] Continuation of Ser. No. 924,726, Oct. 30, 1986, abandoned.

[30] Foreign Application Priority Data

Oct. 30, 1985 [JP] Japan .................................. 60-242399

[51] Int. Cl.⁴ .......................... G11B 23/50; G11B 3/58
[52] U.S. Cl. ........................................ 369/72; 15/234; 369/71; 369/292
[58] Field of Search .................... 369/71, 292, 72, 73, 369/74; 15/234

[56] References Cited

U.S. PATENT DOCUMENTS

| 3,822,065 | 7/1974 | Arbib ................................... 369/74 |
| 4,155,448 | 5/1979 | Horian et al. ................. 15/DIG. 14 |
| 4,227,278 | 10/1980 | Raskin et al. ........................... 15/234 |
| 4,393,487 | 7/1983 | Strawb ................................... 369/74 |
| 4,519,059 | 5/1985 | Denis ..................................... 369/74 |
| 4,535,432 | 8/1985 | Niles et al. ..................... 15/DIG. 14 |

FOREIGN PATENT DOCUMENTS 220724  5/1987  European Pat. Off. ............. 369/74

Primary Examiner—Steven L. Stephan
Attorney, Agent, or Firm—Armstrong, Nikaido, Marmelstein, Kubovcik & Murray

[57] ABSTRACT

A method and device for cleaning the surface of an optical high density information recording carrier. The surface of the carrier is contacted with a fluffy material having a compression resiliency under a load of 200 g of at least 40% and the carrier and the fluffy material are moved relative to each other. The device for cleaning the surface of the carrier includes a support having a fluffy material secured thereto.

3 Claims, 1 Drawing Sheet

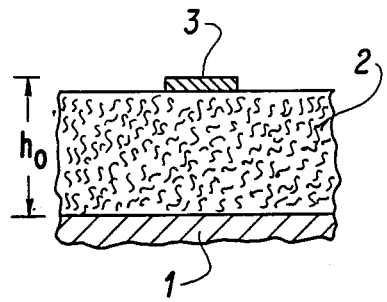
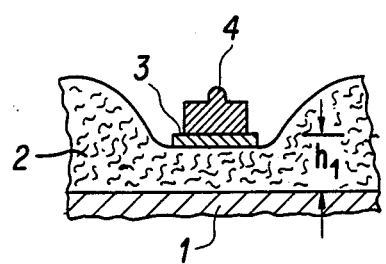
FIG. 1(a)  FIG. 1(b)
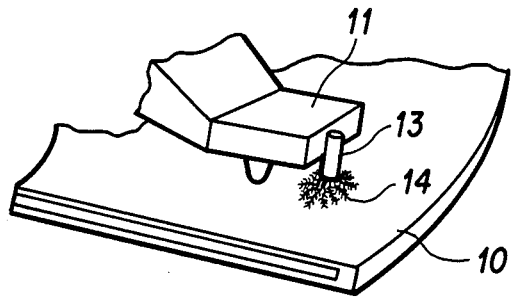
FIG. 2
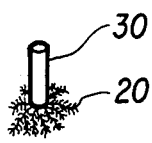
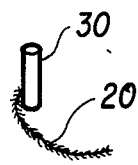
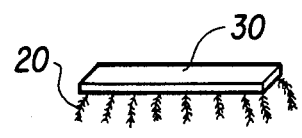
FIG. 3(a)  FIG. 3(b)  FIG. 3(c)

METHOD OF CLEANING THE SURFACE OF AN OPTICAL DISC AND A CLEANING DEVICE

This application is a continuation of application Ser. No. 924,726 filed Oct. 30, 1986 now abandoned.

BACKGROUND OF THE INVENTION

This invention concerns a device for cleaning the surface of a high density information recording carrier. More particularly, it relates to a device for keeping clean the surface of optical disks such as CD, CD-ROM, DRAW and E-DRAW.

BACKGROUND ART

Optical disks as described above have been adapted to read and/or write recording bits on a magnetoptical recording layer by way of a transparent substrate in a reflection or transmission mode. They have the merit of being capable of reading or writing while utilizing a difference in focal depth with no effects from dust or the like deposited on the transparent substrate, whereby the life of the media is nearly permanent. This is in constrast to the case of contact type media such as conventional hard disks or floppy disks.

Although an optical disk is theoretically free from the effects of dust or the like, it is naturally desirable to avoid the deposition of dust and other particles on the optical disk as much as possible. That is, if an optical disk having dust or the like deposited thereon by static electricity or other like cause is left as it is, such dust becomes firmly secured to the surface of the optical disk by means of humidity in the air, finger prints or other similar means. Larger dust particles and the like accumulate and deposit around the adhered particles and eventually make it impossible to effectively utilize the basic characteristic of the optical disk, i.e., the capability of defocusing dust or the like at the surface of the optical disk by utilizing differences in focal depth (refer to Japanese patent Publication No. 32931/1977). Accordingly, it is desirable to remove dust and the like from the surface of an optical disk as rapidly as possible.

Heretofore, devices and chemicals, disk cleaners and CD cleaners, have been commercialized for removing dust and the like from the surface of optical disks. However, in the case of the former, since the surface of the optical disk is contacted with a tool having wool or like other fibers attached or secured thereto, fine scratches are made on the surface of optical disks made of plastics such as polycarbonate and PMMA and, accordingly, a reading error is caused due to the scattering of light. Further, the chemicals used for cleaning the surface of optical disks are mainly composed of a surface active agent. They have only a temporary effect and are highly expensive as well.

Particularly, a power-driven type cleaner adapted to urge the foregoing fibrous materials against the surface of an optical disk while rotating the disk by a motor and to remove dust and other particles from the surface of the optical disk will scratch the surface of the optical disk and, therefore, is not favorable as a disk cleaner.

Accordingly, it is an object of the present invention to provide a device capable of removing particles such as dust and other materials which have deposited on the surface of an optical disk without injuring the optical disk and of preventing dust and the like from depositing on the surface of the optical disk.

A particular object of this invention is to provide a device for removing dust and other materials which can deleteriously affect the performance of an optical disk from the surface of the disk without using special cleaner devices or chemicals and without injuring or marring the surfce of the disk.

SUMMARY OF THE INVENTION

According to the device of the present invention for cleaning the surface of an optical high density information recording carrier the surface of the carrier and a specified fluffly material are moved relative to each other while bringing the fluffry material into contact with the surface of the carrier.

The device for cleaning the surface of an optical high density information recording material according to the present invention includes the fluffy material and a support to which the fluffy material is secured.

BRIEF DESCRIPTION OF THE DRAWINGS

FIG. 1 illustrates the method for determinig compression resiliency of the fluffy material used in the present invention.

FIG. 2 shows an embodiment of a cleaning device according to the present invention.

FIGS. 3(a)–(c) illustrate means for securing a fluffy material to a support member in a cleaning device according to the present invention.

DESCRIPTION OF PREFERRED EMBODIMENTS

As used herein, the terminology "fluffy material" is intended to refer to a loose, soft mass of fur, hair, fibers, feathers or the like.

The optical high density information recording carrier to which the present invention is directd includes any of the known optical recording media such as so-called optical disks, that is, ROM such as a compact disk and a laser disk, and each type of disk such as DRAW and E-DRAW, as well as optical cards, light recording tapes and the like.

The primary feature of the present invention is that the compression resiliency under a load of 200 g of the fluffy material useful in the present invention is 40% or greater. The present inventors have measured the cleaning effect for the surface of optical disks by using various fluffy materials and found that although particles deposited thereon can be removed to some extent by using any fluffy material, most of the materials scratch the surface of the optical disk. In view of the above, the present inventors continued to look for a fluffy material that would not injure, or mar, the surface of the optical disk and, as a result, have found that compression resiliency of the material is one of the important factors. That is, when both the optical disk and the fluffy material are moved relative to each other while being in contact, it has been found that compression resiliericy is the optimal factor for representing the overall performance of the fluffy material, although there are various other factors for avoiding scratches on the optical disks such as friction coefficient, rigidity, size and configuration.

The compression resiliency was measured as described below: First, fluffy material of a predetermined thickness was placed with a sufficient area of contact (for example, 400 $cm^2$) on a flat substrate 1 as shown on the left of FIG. 1, an acrylic plate (2 g) 3 having a diameter of 4 cm was gently placed at the center thereof and the height $h_0$ of the fluffy material 2 including that of the disk 3 was measured. Then, a load 4 of 200 g was gently placed thereon as shown on the right side of FIG. 1, the height $h_1$ for the fluffy material after standing still for 5 minutes was measured and the compression resiliency was determined by the following equation:

$$\text{Compression resiliency } (R) = \frac{h_0 - h_1}{h_0} \times 100$$

The present inventors have made various experiments on the relationship between the compression resiliency (R) and the frequency of generating scratches on the surface of the optical disk for various fluffy materials and, as a result, found that the surface of the optical disk is injured if the compression resiliency is less than 40%.

As the fluffy material having the compression resiliency of at least 40% according to this invention, plumes of birds are particularly preferable but various natural fibers, for example, animal fibers such as those of animal furs, plant fibers such as of seed fluffs and artificial fibers such as regenerated fibers, semi-synthetic fibers and synthetic fibers can also be used.

The plumes of birds as the most preferred fluffy material are variations of skins having been changed in the course of evolution and they are divided into so-called feathers and downs. Feathers comprise rhachis having soft barbs on both sides thereof and, further, smaller barbs attached on the right and left thereof. Downs comprise central rhachis, fine barbs radially extending therefrom and, further, smaller barbs branched from the right and left thereof.

In this invention, any of feathers and downs may preferably be used. These plumes have the advantages of not injuring the disk, of retaining dust between barbs, of giving less effects to optical disks, pick-ups and the like, vibration absorbing effects and, further, of maintainig their configuration for a long period of time.

This invention further concerns a cleaning device for use in the method as described above. The cleaning device comprises the fluffy material and a support to which a portion of the fluffy material is secured. The support can include those stationary portions such as the optical disk insertion part of the writing and/or reading device of an optical disk and/or those movable portions such as optical pick-ups, cassettes for containing the optical disk, or hand cleaners or power-driven cleaners for use with optical disks. FIG. 2 shows one embodiment of a cleaning device according to this invention secured to a pick-up, in which a rod 13 secured with plumes 14 is fixed to an optical pick-up 11, so that the surface of an optical disk 10 is cleaned with the plumes 14 when the optical disk 10 and the optical pick-up 11 move relative to each other.

Plumes 20 are secured to the support means 30, as is shown in FIG. 3, (a) by means of securing the rhachis, or center rhachis radially with adhesives, (b) by means of securing the rhachis on one or both sides, (c) by means of planting them in rows, etc. wherein (a) and (b) can be applied to an optical pick-up and (c) can be applied to the disk insertion port of the optical disk device, hand cleaner, power-driven cleaner, etc.

This invention will now be described while referring to examples.

(EXAMPLE)

Compression resiliency (R) as defined above was measured for four types of materials, that is, polyester fibers, wool, plumes and cotton used s "bedding cotton". Then, they were secured to the top end of a wooden rod of 3 mm diameter with adhesives in the state as shown in FIG. 3(a) and the optical disk was rotated at 1800 rpm while bringing each of the wads slightly into contact with the optical disk, to thereby examine the scratches made on the surface of the optical disk with the naked eye and with a microscope. Table 1 shows the results.

As can be seen from the Table, scratches on the optical disk can be prevented during sliding movement for a long period of time in the case where the compression resiliency (R) is 40% or higher.

TABLE 1

| Types of wads | Compression resiliency | Scratches on the surface of optical disk (1) | | | |
|---|---|---|---|---|---|
| | | Rotation time (min) | | | |
| | | 1 min | 10 min | 1 hour | 5 hour |
| Polyester wads A | 20 | X | XX | XX | XX |
| Polyester wads B | 15 | X | XX | XX | XX |
| Wool wad | 30 | X | XX | XX | XX |
| Feather | 40 | O | O | O | O |
| Down | 60 | O | O | O | O |
| Cotton | 10 | XX | XX | XX | XX |

Remarks: (1) References in the table means:
XX ... scratches resulted which could be observed by naked eye
X ... scratches resulted which could be observed by microscope ($\times$ 100)
O ... no scratches resulted even under microscopic observation ($\times$ 100)

What is claimed is;

1. A cleaning device for cleaning a surface of an optical high density information recording carrier having a transparent plastic substrate and a recording layer supported on a first surface of said transparent plastic substrate, said cleaning device comprising a support member, which is a stationary portion of a writing/reading unit, and feathers supported by said supporting member, wherein said feathers are adapted to contact with a second surface of said transparent substrate which is opposite to said first surface on which said recording layer is supported, and further wherein said feathers have a compression resiliency of a least 40 percent under a load of 200 g.

2. A cleaning device set forth in claim 1 wherein said support member is an optical pick-up assembly of said writing/reading unit for said recording carrier.

3. A cleaning device set forth in claim 1 wherein said feather is down.

* * * * *